R. B. COLTRIN.
FEED REGULATOR.
APPLICATION FILED MAY 11, 1907.

932,110.

Patented Aug. 24, 1909.

2 SHEETS—SHEET 1.

Witnesses
Harry R. L. White
Ray White

Inventor
Robert Bruce Coltrin
By Foree Bain & May
Attys

R. B. COLTRIN.
FEED REGULATOR.
APPLICATION FILED MAY 11, 1907.
932,110.
Patented Aug. 24, 1909.
2 SHEETS—SHEET 2.
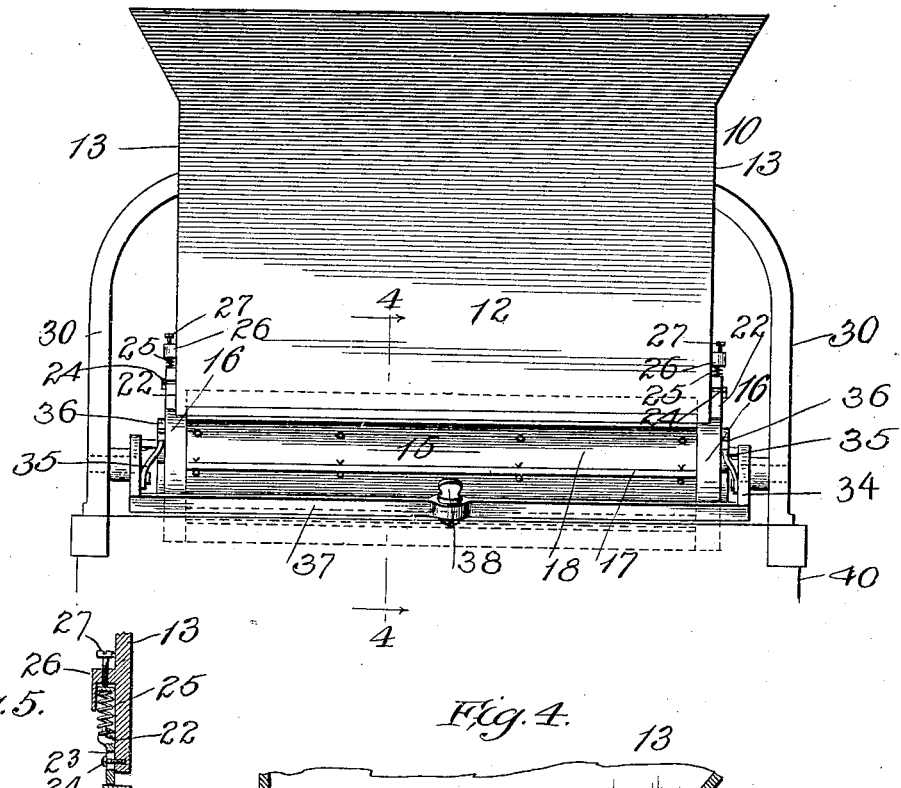
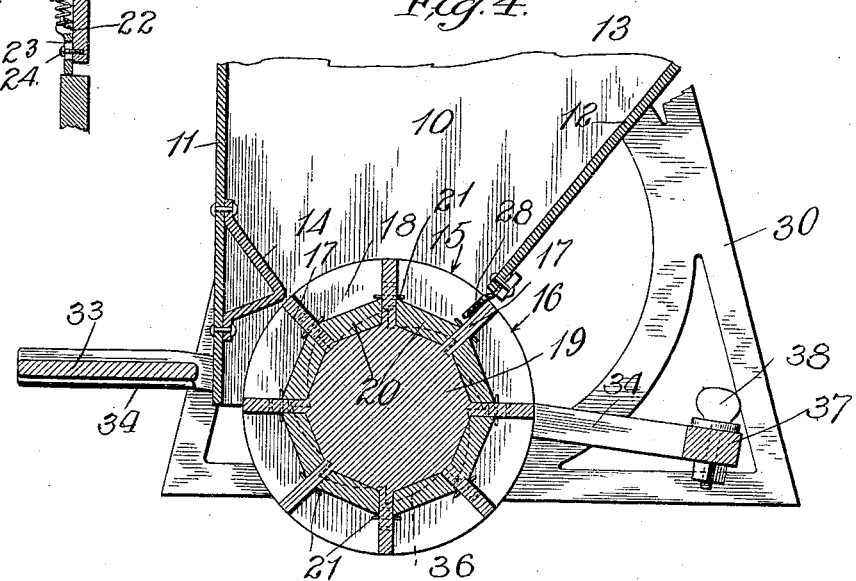
Witnesses
Harry R. L. White
Ray. White.
Inventor
Robert Bruce Coltrin
By Foree Bain & May
Attys

UNITED STATES PATENT OFFICE.

ROBERT BRUCE COLTRIN, OF JACKSON, MICHIGAN.

FEED-REGULATOR.

932,110.

Specification of Letters Patent.

Patented Aug. 24, 1909.

Application filed May 11, 1907. Serial No. 373,090.

*To all whom it may concern:*

Be it known that I, ROBERT BRUCE COLTRIN, a citizen of the United States, residing at Jackson, in the county of Jackson and State of Michigan, have invented certain new and useful Improvements in Feed - Regulators, of which the following is a specification.

My invention relates to improvements in material feeders, and has for its salient object to provide a means for measuring and delivering from a feed reservoir prescribed quantities of material, arranged for automatic actuation by the delivery to a part thereof exterior to the reservoir, of other bodies of material.

The particular embodiment of my invention, which I have herein shown and will describe, relates more particularly to a cement feeding apparatus, adapted to deliver from a supply reservoir a definite quantity of cement for admixture with each shovelful of sand or other material, applied to a movable actuating part extraneous to the reservoir.

A feeder of this type should be simple in construction, easy of manufacture and repair, free from complicated mechanism, adapted to stand hard usage, and reliable and uniform in its operations. These objects I attain in my feeder, which in the embodiment shown, comprises in general a reservoir having a bottom opening constantly closed by a rotatable pocketed trap, whereof each pocket, filled while standing in communication with the reservoir, may deliver its contained material to a prescribed mixing area when rotated to position out of register with the reservoir opening, said trap being operatively associated with a self-dumping load table, mounted for movement when the load is applied thereto to dump its load into the same mixing area, and for automatic return when relieved of its load, and arranged by such movements to so rotate the trap as to cause the delivery of a measured quantity of cement.

Figure 1:
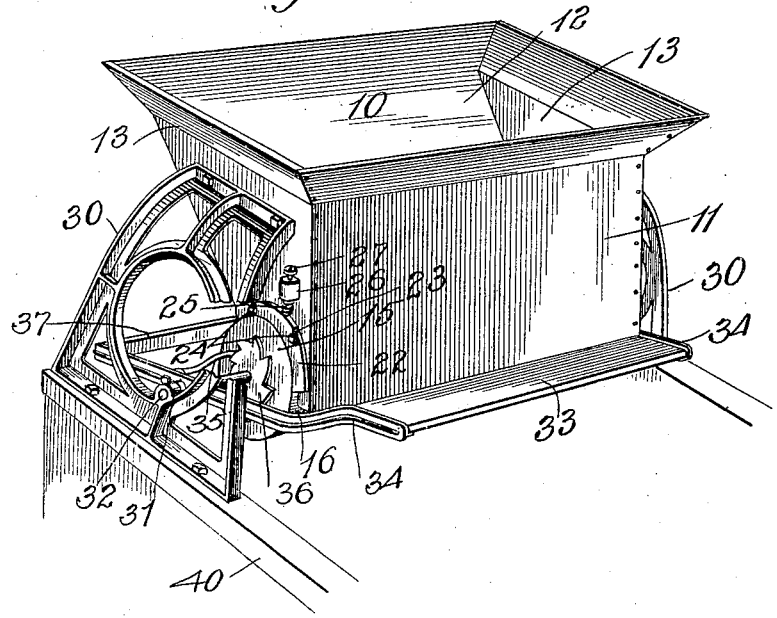
Figure 2:
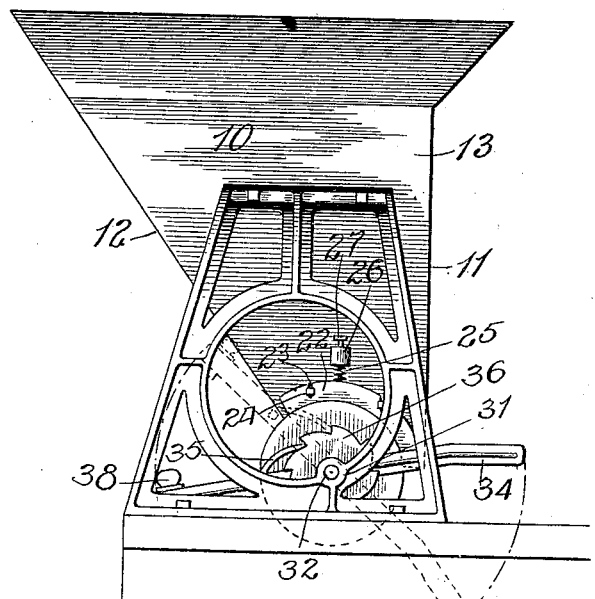

Other and further objects of my invention, and points of advantage of the particular construction will become apparent to those skilled in the art from the following description taken in conjunction with the accompanying drawings, wherein;

Figure 1 is a perspective view of the feeder. Fig. 2 is an end view thereof; Fig. 3 is a rear elevation; Fig. 4 is a section on line 4—4 of Fig. 3, and Fig. 5 is a sectional detail.

Throughout the several views like numerals of reference refer always to like parts.

In the drawings 10 indicates in general a reservoir or hopper, comprising a substantially straight front wall 11, an inclined rear wall 12, preferably both of sheet metal, and end walls 13—13, which may, for convenience, be castings, the inner face of wall 11 being near the bottom provided with an inclined delivery projection or lip 14, which may conveniently be a bent strip of sheet metal, riveted to the wall, as shown in Fig. 4. The lower end or base of the reservoir 10 is structurally open, and is arranged for the reception of a rotatable trap generally cylindrical and provided with peripheral pockets. Such trap, generally indicated at 15, preferably comprises circular ends or heads 16, connected by longitudinally extending, radial connecting ribs or blades 17, having their edges flush with the peripheries of the circular heads, the spaces 18 between the blades constituting longitudinal pockets, open from head to head of the trap, and extending inward to a central core 19, which may be cast integral with the ribs and ends. I provide for varying the capacity of the pockets, by the provision of insert boards 20 to form false bottoms for the pockets 18, such boards being retained in place as by cotter pins 21 taking through suitable apertures in the blades 17. Obviously by using false bottoms of different thicknesses the desired normal pocket capacity may be attained.

As shown, the trap 15 extends lengthwise of the reservoir 10 from one end thereof to the other, its blade path closely approaching the edges of the back member 12, and the delivery lip 14 of a reservoir casing, and its heads 16—16 make close connection with the ends of the casing. For effecting such close end connection, I preferably provide upon each end piece 13 of the casing, an arcuate wearing shoe 22, conforming with the periphery of the proximate head 16, and provided with vertical slots engaging pins 24, projecting from the casing end 13, the shoe being preferably spring-pressed into contact with the periphery of the trap head. Preferably the spring, indicated at 25, is seated in a hollow boss 26, on the casing end member 13, and bottomed against an adjusting screw 27, extending through the closed top of the boss. Thus close contact under pressure regulable by the adjustment of screw 27 is maintained between the heads of the trap and the wear plate for the casing end.

For preventing leakage of material from the hopper at the bottom of its rear wall 12, a flexible strip 28, preferably of fabric, is secured to the lower extremity of the wall 12, to hang in the path of the blades 18.

The casing 10 is supported on end brackets 30, bolted to the end walls 13 thereof, and swelling outwardly a suitable distance therefrom, such brackets at suitable points providing bearings 31 for shaft sections 32 which extend inward and support for rotation the rotatable trap.

33 indicates a load table, normally standing in position close to the front wall 11, of the reservoir, and carried by lever arms 34, pivotally mounted on shaft sections 32, and preferably extending beyond the hopper in rear of said shaft. Each lever arm 34 carries a pivoted gravity pawl 35 arranged in coöperative relation with a ratchet 36, having as many teeth as there are pockets 18 in the rotatable trap, and secured to and made integral with the proximate head of the trap. The rear ends of the levers 34 are preferably connected by a cross bar 37, having secured thereto a knocker 38, and the proportions of the parts are preferably such that the load table 33 is normally overbalanced by the weight of the rear ends of the levers 34 and their connected parts, so that the load table may be normally positioned by gravity action, and the use of springs and the like for such purposes dispensed with.

The arrangement of parts is such that when the load table is in normal position it stands at approximately right angles to and close against the front wall 11 of the reservoir, and when depressed by a load, swings down to dumping position, thereby elevating the rear cross bar 37 till the knocker 38 strikes the inclined rear wall 12 of the reservoir, the pawls 35 at the same time moving the trap 15 forward to an extent corresponding with the peripheral opening of one pocket, and positioning the trap with two of its blades 17 forming substantial continuations of the delivery lip 14 and rear wall 12 of the reservoir respectively.

In use the device is preferably mounted upon the frame work of a suitable mixer, fragmentally indicated at 40, and the operator having filled the reservoir 10 with cement, operates the machine by depositing a shovelful of sand, stone or other body material wherewith the cement is to be mixed, upon the load table 33. As the weight of sand or other body material depresses the load table, the material slides off into the mixer 40, the trap is rotated to dump a pocketful of cement into mixer 40, and at the same time the rear wall 12 of the reservoir is struck a sharp blow sufficient to agitate the cement and keep it from sticking or bridging across the base opening of the reservoir.

I have found from field experience that a mixture of body material and cement in desired proportions may be secured to a practical nicety, with the advantage of very even mixing, due to the fact that the supply of each shovelful of body material for the mixture is accompanied by the feeding of a duly proportioned quantity of cement.

While I have herein described my invention particularly as a feeder of cement, it will be apparent that it may be widely used for other materials as a proportionate feeder, and I do not desire to be understood as limiting my invention to such use, nor to the details of the particular construction described, as it will be apparent that many changes in the specific embodiment of my invention might be made without departure from its spirit and scope.

Having thus described my invention, what I claim and desire to secure by Letters Patent, of the United States, is:

1. In a machine of the character described, a feed reservoir provided with a base opening, a measuring trap associated with said opening arranged when actuated to trap material from the feed reservoir into a prescribed area, a load table outside of the reservoir, arranged when depressed to dump its load into the same prescribed area, and operative connections between said table and the trap, whereby said trap is caused to deliver a prescribed quantity of material from the reservoir into said area with each depression of said table.

2. In a machine of the character described, a feed reservoir with a base opening, a rotatable pocketed trap closing said opening and arranged when rotated to trap material from the feed reservoir into a prescribed area, a load-depressible table arranged when depressed to dump its load into the same prescribed area, and operative connections between the table and trap whereby said trap is rotated to empty one or more pockets with each depression of said table.

3. In a machine of the character described, a reservoir with a base opening, a rotatable, peripherally pocketed trap constantly closing said base opening, and arranged to trap material from the reservoir into a prescribed mixing area, a pivoted load table, arranged to be depressed to dump its load into said mixing area by the weight of such load, means for restoring said load table, and operative connections between the load table and trap whereby movement of said table rotates the trap.

4. In a machine of the character described, a reservoir having a base opening, a rotatable trap closing said base opening, and provided with peripheral pockets arranged to trap material from said reservoir into a prescribed mixing area, a pivoted load table depressible by the weight of its load to dump said load into said mixing area, means for restoring said load table to normal position, and a ratchet and pawl connection between said load table and the trap.

5. In a machine of the character described, a reservoir having an upright front wall, and a base opening, means for delivering measured quantities of material from said reservoir through said base opening, a load table arranged for depression by a load to dump said load, normally standing close to said upright front wall of the reservoir and projecting outward therefrom, and operative connections between the load table and the trap.

6. In a measuring device, a hopper having a base opening, a cylindrical trap having peripheral pockets and substantially closing said base opening, said trap having round heads at its end, arcuate contact shoes carried by the ends of the hopper, movable radially toward and from said trap heads, and springs for holding said shoes in contact with said heads.

7. In a machine of the character described, a reservoir provided with a base opening, a trapping device for delivering material therefrom, a load table, operatively connected with the trapping device, and a knocker for vibrating the hopper operatively connected with the load table.

8. In a machine of the character described, a reservoir having a longitudinal base opening, a rotatable trapping device with its axis arranged longitudinally of said base opening, and rotatable therebeneath, a load table pivoted coaxially with the trap, a ratchet and pawl connection between said load table and the trap, and means for jarring the reservoir, operatively associated with the load table.

9. In a machine of the character described, a reservoir having a base opening, a peripherally pocketed trap rotatable on a longitudinal axis therebeneath, a load table, supports for said load table pivoted coaxially with said rotatable trap and extending beyond the pivotal axis, ratchet and pawl connections between the load table supports and the trap, and means carried by the load table supports for jarring the reservoir during the operation of the load table.

In testimony whereof I hereunto set my hand in the presence of two witnesses.

ROBERT BRUCE COLTRIN.

In the presence of—
JOHN L. BENTLEY,
WILLIAM B. KNICKERBOCKER.